United States Patent [19]

Gale et al.

[11] 4,049,037
[45] Sept. 20, 1977

[54] INFLATION VALVE FOR TUBELESS TIRE

[75] Inventors: Ronald J. Gale, Hornchurch; Edwin M. Rowbotham, Colchester, both of England

[73] Assignee: Ford Motor Company, Dearborn, Mich.

[21] Appl. No.: 693,575

[22] Filed: June 7, 1976

[30] Foreign Application Priority Data

June 10, 1975 United Kingdom ............... 24738/75

[51] Int. Cl.² ........................................... B60C 29/00
[52] U.S. Cl. ................................................. 152/427
[58] Field of Search ............... 152/427, 429, DIG. 11; 137/223; 141/38

[56] References Cited
U.S. PATENT DOCUMENTS

| 2,813,568 | 11/1957 | Kilmarx, Jr. | 152/427 |
| 3,191,655 | 6/1965 | McCord | 152/427 |
| 3,213,915 | 10/1965 | Smith | 152/427 |
| 3,280,879 | 10/1966 | Simms | 152/427 |
| 3,542,109 | 11/1970 | Stroh | 152/427 |
| 3,712,326 | 1/1973 | Thacker | 152/427 |

Primary Examiner—Drayton E. Hoffman
Attorney, Agent, or Firm—Clifford L. Sadler; Keith L. Zerschling

[57] ABSTRACT

An inflation valve for a tubeless tire according to the present disclosure includes a one-piece valve housing that is molded of a rigid plastic material. The housing has an internal passage threaded at one end to accommodate a valve core. The base of the housing has an annular groove defined in part, by a three part flange that permits the housing to be forced through a valve hole in the wheel rim. A rubber O-ring contained in the annular groove forms a seal between the valve housing and the wheel rim.

5 Claims, 3 Drawing Figures

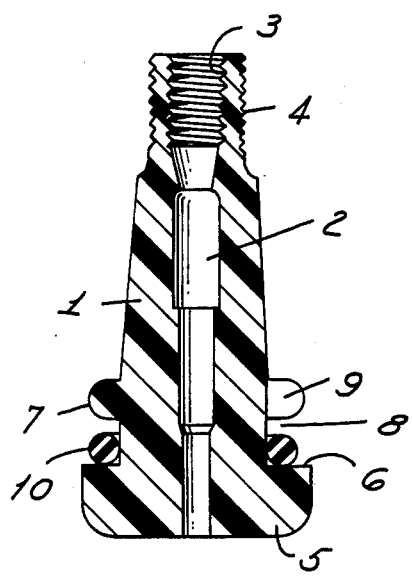
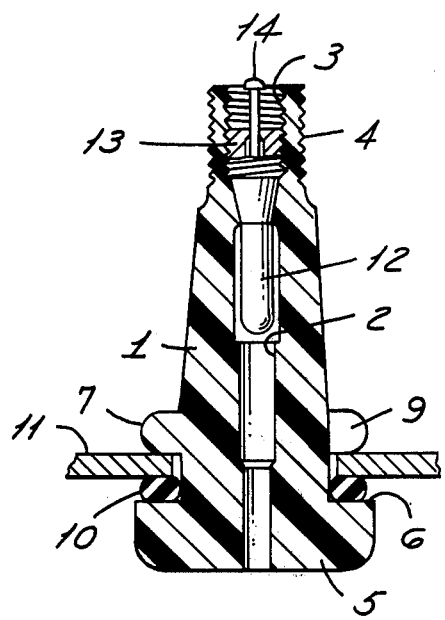
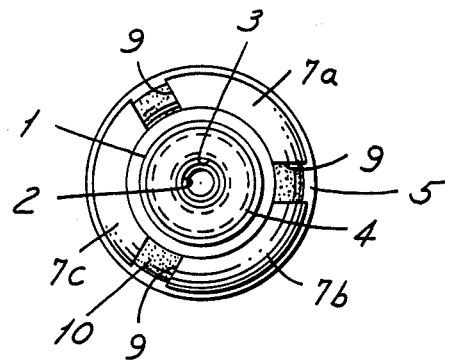

INFLATION VALVE FOR TUBELESS TIRE

BACKGROUND OF THE DISCLOSURE

This disclosure relates to inflation valves to be fitted to wheels having tubeless tires. Known tire valve assemblies include a tube of brass or other rigid material molded into a resilient rubber body. The tube is internally screw-threaded to receive a valve core which has a screw-threaded portion cooperating with the screw-threads on the tube to retain the core in place.

In the prior art constructions, the resiliency of the rubber body is needed to permit the housing to be forced through the valve hole in the wheel rim and provide sealing engagement between the housing and the wheel rim. The rigidity of the tube is needed to support and retain the valve core.

U.S. Pat. Nos. 3,191,655 and 3,741,267 are the most pertinent known prior art. In each of these patents, the valve housing has at least two main parts. A first bulbous lower part of soft rubber that is resilient to sealingly engage the rim adjacent the periphery of the valve hole and a second upper part that is rigid to threadily engage and retain the valve core. In both of these patents additional structure is provided to reinforce the connection between the lower resilient part and the upper rigid part.

In accordance with the present invention a more economical, simplified valve housing is provided. The housing is of one piece construction.

BRIEF SUMMARY OF THE DISCLOSURE

It is an aim of the invention to provide a valve housing having a more simple construction than that disclosed in the prior art. Accordingly, the invention is directed to a valve housing for a wheel having a tubeless tire, the housing being formed as a rigid one-piece plastic material molding and having a passage therethrough for the flow of air. The internal wall of the housing that defines the passage has screw-threads whereby a valve core, which has an externally threaded portion, can be inserted into the passage and retained in place.

The lower end of the one-piece housing is of generally bulbous shape with a groove defined by a shoulder and a three-part flange spaced from the shoulder. The three part construction of the flange permits the valve housing to be forced through the valve hole in the wheel rim. A rubber O-ring is located in the groove and provides an air-tight seal between the housing shoulder and the rim.

By making the valve housing in one piece from a suitable rigid plastic material in a single injection molding operation the housing can be produced relatively inexpensively.

BRIEF DESCRIPTION OF THE DRAWINGS

In order that the invention may be more readily understood, an embodiment of a valve housing according to the invention will now be described by way of example and with reference to the accompanying drawings, in which:

FIG. 1 is a vertical sectional view of a valve housing according to the invention;

FIG. 2 is a top plan view of the valve housing of FIG. 1; and

FIG. 3 is a vertical sectional view of the valve housing of FIG. 1 installed in a wheel rim and containing the valve core.

DETAILED DESCRIPTION OF A PREFERRED EMBODIMENT

The figures show a valve housing 1 for a wheel having a rim 11 constructed to be fitted with a tubeless tire. The housing 11 is manufactured by injection molding from a suitably strong and rigid plastic material such as a polyacetal. The housing 1 is of generally cylindrical shape, but its outer surface is both stepped and tapered so that its base 5 is of larger external diameter than its upper portion.

A passage 2 extends longitudinally and centrally through the housing 1, the passage serving for the flow of air through the housing. The internal wall of the valve housing 1 which defines the passage 2 is provided at its upper portion with screw-threads 3. The passage 2 serves to receive a valve core 12 (see FIG. 3) of conventional design. U.S. Pat. No. 2,862,515 discloses one type of valve core that is adaptable for use in the housing 1. The valve core 12 have a screw-threaded portion 13 adapted to cooperate with the threads 3 to retain the core in place. The valve core 12 also includes a valve pin 14 that is spring pressed to a closed position and which may be depressed to open the valve passage 2 in a conventional manner.

The upper portion of the housing 1 is externally screw-threaded at 4 to receive a conventional dust cap (not shown).

The housing 1 has a base 5 of larger external diameter than the adjacent housing portion, and a shoulder 6 is formed where the base joins such adjacent housing portion. A circumferentially extending flange 7 projects from the valve housing 1 at a location above the shoulder 6, an annular recess 8 being defined between the flange 7 and shoulder 6. As shown in FIG. 2, the flange 7 is not continuous, but comprises three equally sized parts 7a, 7b, and 7c separated by gaps 9. A rubber O-ring 10 is located in the recess 8.

OPERATION

In use of the housing 1, the housing is pushed through a valve receiving aperture in a wheel rim 11. The smaller diameter upper end of the housing 1 is inserted into the valve hole of the rim 11 from the inside of the rim, that is the face of the rim which will be inside a tire when fitted. The external diameter of the flange 7 is of an undeformed diameter which is slightly larger than the valve hole so that as the housing 1 is forced into position the parts 7a, 7b, and 7c will deform slightly as permitted by the gaps 9 to allow the flange 7 to be forced through the aperture. When the housing 1 is thus snapfitted into position, the periphery of the valve hole in the rim 11 is positioned in the annular recess 8 between the flange 7 and the O-ring 10. The flange 7 prevents the housing 1 from falling through the valve hole in the rim 11 into the interior of the tire since this could otherwise occur before inflation of the tire. The base 5, or rather the shoulder 6 of the base, prevents the housing 1 from being forced outwardly through the valve hole in the rim 11 when the tire is fitted and inflated.

SUMMARY

The body of the housing 1 is of one-piece construction, that is, it is molded of a rigid plastic material. The portion of the housing 1 that threadedly engages the valve core 12 is integral with and of the same rigid material as the portion of the housing that engages the rim 11.

The O-ring 10 form an air-tight seal between the rim 11 and the shoulder 6. The O-ring 10 is a standard commercial part and does not have to be specifically molded for use with the housing 1. The O-ring 10 is merely snapped into the groove 8 without the need for any complicated manufacturing step.

The foregoing description presents the presently preferred embodiment of this invention. Modifications and alternations may occur to those skilled in the art that come within the scope of the following claims.

We claim:

1. An inflation valve assembly for a wheel and tubeless tire combination comprising a valve housing having an interior wall defining an air passage;
   said interior wall having a screw-threaded portion constructed to threadedly receive a valve core;
   said housing having a shoulder and a flange means spaced apart from said shoulder;
   said flange means comprising a plurality of circumferentially spaced apart flange portions;
   said shoulder and said flange means defining a groove therebetween constructed to receive the periphery of a valve hole in a wheel rim;
   an elastomeric annular seal disposed in said groove sealingly engaging said shoulder and constructed to engage said wheel rim;
   said screw-threaded portion, said shoulder and said flange means being integral portions of said housing;
   said seal being a separate element from said shoulder and said shoulder having substantially greater rigidity than said seal.

2. An inflation valve assembly for a wheel and tubeless tire combination comprising a valve housing having an interior wall defining an air passage;
   said interior wall having a screw-threaded portion constructed to threadedly receive a valve core;
   said housing having a shoulder and a flange means spaced apart from said shoulder;
   said housing being a one-piece rigid plastic member;
   said flange means comprising a plurality of circumferentially spaced apart flange portions;
   said shoulder and said flange means defining a groove therebetween constructed to receive the periphery of a valve hole in a wheel rim;
   an elastomeric annular seal disposed in said groove sealingly engaging said shoulder and constructed to engage said wheel rim;
   said screw-threaded portion, said shoulder and said flange means being integral portions of said housing;
   said seal being a separate element from said shoulder and said shoulder having substantially greater rigidity than said seal.

3. An inflation valve assembly supported by a wheel rim;
   said assembly including a valve housing having an interior wall defining an air passage;
   said interior wall having a screw-threaded portion;
   a valve core disposed in said passage having an externally threaded portion threadedly engaging said threaded portion of said interior wall;
   said housing having an externally threaded portion constructed to receive a dust cap;
   said housing having an enlarged lower portion with an annular shoulder;
   said housing having a flange means spaced apart from said shoulder;
   said flange means comprising a plurality of circumferentially spaced apart flange portions;
   said flange means cooperating with said shoulder to define an annular groove therebetween;
   said rim having an interior edge defining a valve hole;
   said edge being disposed in said groove
   an elastomeric annular seal sealingly engaging said shoulder and said wheel rim;
   said annular seal being a separate element from said shoulder;
   said shoulder having substantially greater rigidity than said seal.
   said shoulder, said flange means and threaded portion of said interior wall comprising integral portions of said housing.

4. An inflation valve housing having an upper portion and a lower portion;
   said upper portion of said housing having an interior wall defining an air passage;
   said interior wall having a screw-threaded portion;
   a valve core disposed in said passage having an externally threaded portion threadedly engaging said threaded portion of said interior wall;
   said upper portion of said housing having an externally threaded portion constructed to receive a dust cap;
   said housing having an enlarged lower portion with an annular shoulder;
   said lower portion having flange means spaced apart from said shoulder;
   said flange means cooperating with said shoulder to define an annular groove therebetween;
   said flange means comprising a plurality of circumferentially spaced apart flange portions;
   a wheel rim having a valve hole;
   said valve hole having a peripheral edge disposed in said groove;
   an elastomeric annular seal sealingly engaging said shoulder and said wheel rim;
   said housing, including all of the portions of said housing, being a one-piece rigid plastic member;
   said seal being a member separate from said housing;
   said seal being substantially more pliable than said housing.

5. The combination according to claim 4 and including:
   said seal comprising an O-ring.

* * * * *